US 6,769,523 B2

(12) United States Patent
Muetzel et al.

(10) Patent No.: US 6,769,523 B2
(45) Date of Patent: Aug. 3, 2004

(54) CLUTCH CONTROL FOR OVERCOMING TOOTH BUTT

(75) Inventors: Ronald P. Muetzel, Pinehurst, NC (US); Robert A. Sayman, Eriskirch (DE); James H. Devore, Laurinburg, NC (US)

(73) Assignee: ZF Meritor, LLC, Maxton, NC (US)

( * ) Notice: Subject to any disclaimer, the term of this patent is extended or adjusted under 35 U.S.C. 154(b) by 0 days.

(21) Appl. No.: 10/324,646

(22) Filed: Dec. 19, 2002

(65) Prior Publication Data

US 2004/0118652 A1 Jun. 24, 2004

(51) Int. Cl.[7] .............................................. B60K 41/22
(52) U.S. Cl. ...................... 192/3.55; 192/3.61; 74/335
(58) Field of Search ............................. 192/3.55, 3.58, 192/3.61, 3.63; 74/335, 339

(56) References Cited

U.S. PATENT DOCUMENTS 5,099,711 A * 3/1992 Langbo et al. ............ 74/336 R
5,389,053 A * 2/1995 Steeby et al. ................ 477/123
5,408,895 A * 4/1995 Chan et al. .................... 74/335

* cited by examiner

Primary Examiner—Richard M. Lorence
(74) Attorney, Agent, or Firm—Carlson, Gaskey & Olds

(57) ABSTRACT

A strategy for overcoming a tooth butt condition includes changing a target closed clutch position over time. When a tooth butt condition exists, a controller selectively closes a clutch to provide limited engagement between the engine and the transmission. A first target closed clutch position is used on the first attempt. If the tooth butt condition is not resolved, the controller then changes the target closed clutch position to provide a different level of engagement between the engine and the transmission. This process is repeated until the tooth butt condition is resolved, a preselected period of time expires, a maximum number of attempts has been completed or the maximum desirable closed clutch position has been used.

18 Claims, 2 Drawing Sheets

CLUTCH CONTROL FOR OVERCOMING TOOTH BUTT

BACKGROUND OF THE INVENTION

This invention generally relates to a control strategy for avoiding tooth butt conditions in a vehicle transmission. More particularly, this invention relates to a clutch control strategy for overcoming tooth butt situations.

In vehicle drive lines, there typically is an engine that provides a driving force to wheel axles through a transmission that allows for selective gear ratios to be established between the engine output shaft and the wheel axles. Many arrangements include a clutch between the engine and the transmission for selectively coupling the output from the engine to the input to the transmission.

One difficulty associated with operating such systems is accommodating proper engagement of the gear members within the transmission gear box. There are a variety of situations where particular control is required to achieve a successful shift between gear ratios.

One situation that may be encountered during a shift is the so-called tooth butt condition. In order for gear members to be properly meshed, the teeth on one gear member must fit within the spacings between teeth on a cooperating gear member. At times, the gear members are aligned in a manner that the teeth abut against the teeth on the cooperating gear members rather than fitting into the spacings between the teeth. This condition must be dealt with or the desired gear cannot be engaged. This is especially likely when a shift is attempted while the vehicle is not moving.

Traditional methods of overcoming a tooth butt situation include repeatedly engaging the clutch and then releasing the clutch in an attempt to provide some rotation to the input shaft of the transmission to move the gear members relative to each other so that the teeth are no longer aligned. There are several shortcomings and drawbacks associated with this approach.

One difficulty is that the optimum target position for how far the clutch should be closed varies between different transmissions, different vehicles and different operating conditions. Factors such as oil temperature, tolerances and torque curves all have an effect on the correct or optimum target clutch position. Conventional arrangements do not accommodate such variations.

Because of the varying amount of clutch closure needed between transmissions or vehicles, the conventionally calibrated target position of a clutch to avoid a tooth butt condition is set undesirably high for some situations. While a consistent target clutch position may allow for proper meshing and full engagement under most situations, it can result in degraded shift comfort or unwanted transmission faults. For example, the vehicle driver may experience a bump upon engagement. Conversely, setting the consistent target clutch position at a low value may prevent proper engagement under many conditions for some transmission models.

There is a need for an improved strategy for overcoming a tooth butt condition without adding complexity or cost to the system. This invention addresses that need while avoiding the shortcomings and drawbacks of the prior art.

SUMMARY OF THE INVENTION

In general terms, this invention is a strategy for overcoming a tooth butt condition by varying a target clutch position over time so that successful gear engagement becomes possible.

In one system designed according to this invention, a clutch is associated with a transmission that includes a plurality of selectively engageable gear members. The clutch selectively couples an engine with the transmission. A controller determines when a tooth butt condition exists and automatically closes the clutch to a target position to provide some engagement between the engine and the transmission. The controller varies the target clutch position over time until a successful gear shift is completed or the controller determines that a selected criteria is met.

One method of overcoming a tooth butt condition designed according to this invention includes determining that a tooth butt condition exists. A clutch is then closed to a target position in an attempt to move at least one of the gear members relative to the other by selectively coupling the engine to the transmission for a limited time. If the tooth butt condition is not yet eliminated, then the clutch is closed to a second, different target position to provide a different level of coupling between the engine and the transmission. This process preferably is repeated a sufficient number of times to overcome the tooth butt condition or until a selected criteria is satisfied.

A variety of factors may be taken into account for modifying or customizing the manner in which the different target clutch engagement positions are set.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENTS

Figure 1:
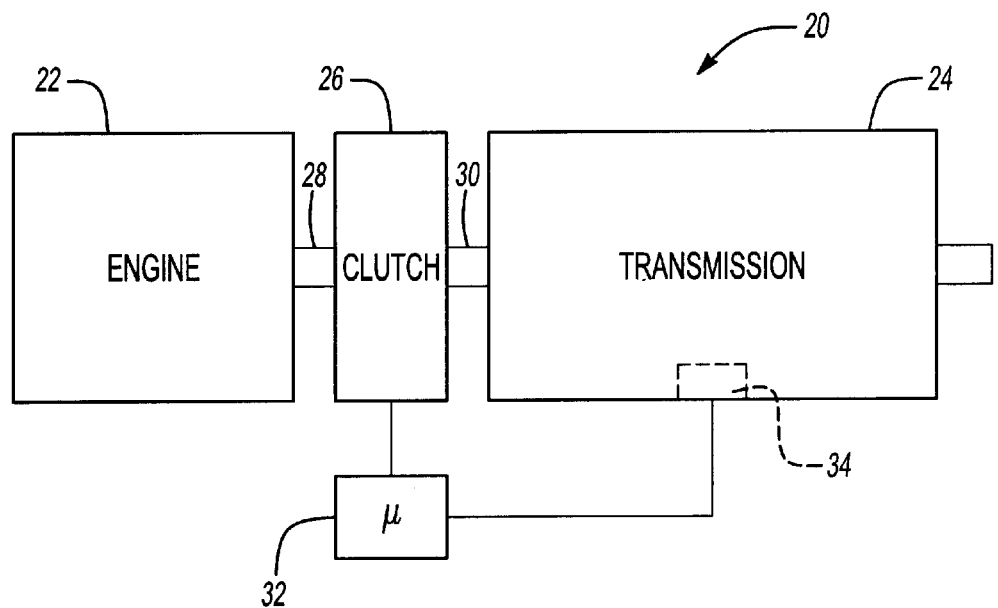
FIG. 1 schematically illustrates selected portions of a vehicle driveline system designed according to this invention.

FIG. 1 schematically illustrates selected portions of a vehicle driveline system 20. An engine 22 provides driving torque to wheels (not illustrated) of the vehicle through a transmission 24. As known, the transmission 24 includes a plurality of gear members that are selectively engaged to provide a desired gear ratio between the engine and the vehicle wheels.

A clutch 26 selectively couples an output 28 from the engine 22 to an input shaft 30 of the transmission 24. A variety of known clutch configurations can be used as the clutch 26. A controller 32 automatically selectively controls the open or closed condition of the clutch 26 to achieve a desired amount of engagement between the engine 22 and the transmission 24. In the illustrated example, a plurality of conventional sensors 34 provide information to the controller 32 regarding the condition of the transmission (i.e., neutral, gear engaged, etc.).

A variety of commercially available microprocessors may be used as the controller 32. In one example, the controller 32 is a portion of a controller already present on the vehicle. In another example, the controller 32 is a dedicated microprocessor. Those skilled in the art who have the benefit of this description will be able to select an appropriate controller to meet the needs of their particular situation. Those skilled in the art who have the benefit of this description will be able to program a controller to perform the functions of the example controller of this description.

Figure 2:
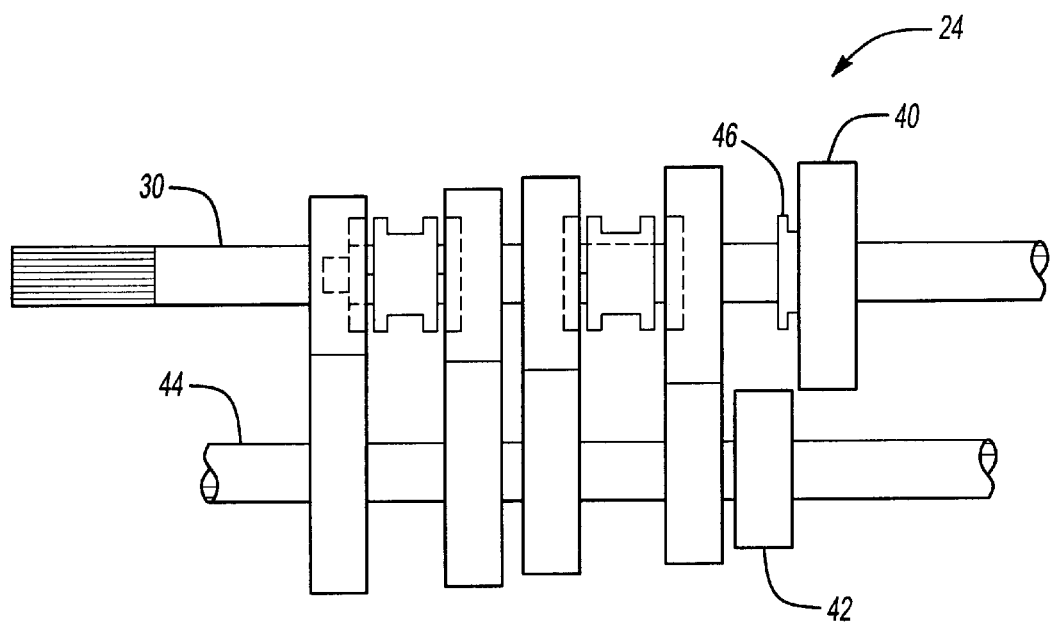
FIG. 2 schematically illustrated selected portions of a transmission in a first operating condition.

Under some operating conditions, especially at standstill, it is possible for there to be a tooth butt condition within the transmission 24. Referring to FIG. 2, a gear member 40 supported on the transmission input shaft 30 is not engaged with a gear member 42, which is supported on a countershaft 44. As known, a shift collar 46 may be used to move the gear member 40 into a position to be engaged with the gear member 42 for driving the vehicle in first gear, for example. This latter condition is schematically shown in FIG. 3.

Figure 3:
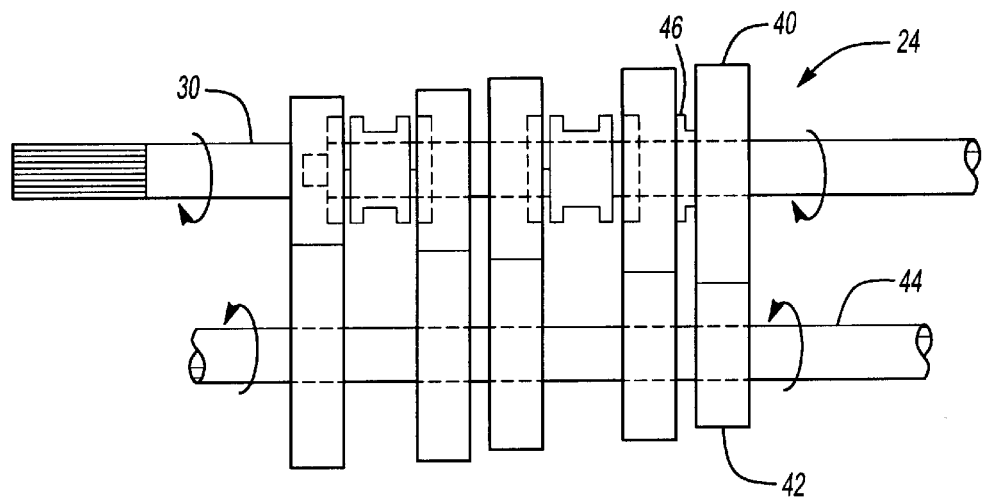
FIG. 3 schematically illustrates the embodiment of FIG. 2 in a second operating condition.

The transition from the transmission condition of FIG. 2 to that shown in FIG. 3 may be hindered by a tooth butt condition where the teeth on the gear member 40 are aligned with the teeth on the gear member 42 (rather than aligned with the spacing between the teeth on the gear member 42).

The inventive system overcomes such a tooth butt condition by selectively controlling the clutch 26 to provide some rotation to the transmission input shaft 30 and the associated gear members, such as the gear member 40, by selectively coupling the engine 22 with the transmission 24. According to this invention, the clutch 26 preferably is selectively closed to a target close position that varies over time. In one example, the target close position increases over time until a successful gear engagement is obtained or a selected control criteria is satisfied.

Figure 4:
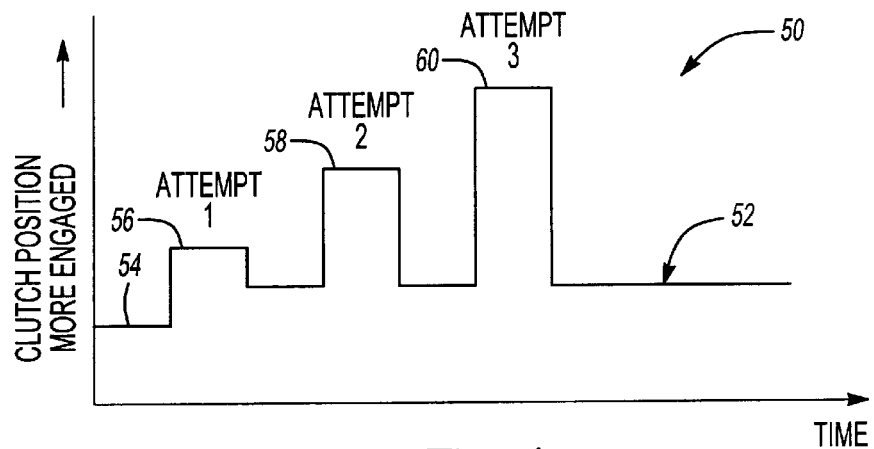
FIG. 4 graphically illustrates an example clutch closing strategy according to this invention.

FIG. 4 schematically illustrates one example strategy for controlling a clutch 26 to overcome a tooth butt condition according to this invention. The plot 50 shows a plurality of closed clutch positions used over time in an attempt to allow proper gear engagement. The curve 52 schematically shows the clutch position changing over time.

A "fully open" clutch position is shown at 54. Once the controller 32 determines that a tooth butt condition exists that is preventing a desired gear engagement from occurring in the transmission 24, the controller 32 preferably automatically causes the clutch 26 to temporarily move to a closed position shown at 56. Assuming that a successful gear engagement has not yet occurred, the controller 32 preferably next moves the clutch 26 to a closed position at 58. According to the illustrated example of FIG. 4, the second closed position is more closed (i.e., more engagement between the engine 22 and the transmission 24) than the closed position 56. Assuming that the tooth butt condition still has not been overcome, the controller 32 then closes the clutch 26 to a position 60. As can be appreciated from the illustration, in this example, the controller does not return the clutch to a "fully open" position between the different closed positions.

In one example, the controller 32 preferably is programmed to continue trying new closed clutch positions until the tooth butt condition has been eliminated or a preselected amount of time has expired. In another example, the controller 32 is programmed to continue attempting to resolve the tooth butt condition by using different closed clutch positions until a preselected number of attempts have been completed. In another example, the controller uses different closed clutch positions until a maximum desirable level of engagement between the engine and the transmission occurs.

By incrementally changing the closed position of the clutch over time, the inventive arrangement allows for using a baseline or initial closed position that may prove satisfactory for some operating conditions in some transmission models. Changing (i.e., increasing) the closed position of the clutch with each successive attempt allows for the system to accommodate different operating conditions such as temperature levels, oil viscosity, component wear, etc.

In the example of FIG. 4, the closed clutch position is incrementally increased some selected amount. In one example, the controller 32 is programmed to determine the target clutch position using the following formula: target clutch position=base position+offset (attempt #−1). In one example, the controller 32 continues to increase the closed position of the clutch by the offset amount until the maximum amount of attempts have been completed, a selected amount of time has expired or the closed clutch position reaches a determined maximum desirable position.

In one example system if the tooth butt condition is not eliminated after the controller has utilized all available closed clutch positions, an automated gear shifting mechanism (not illustrated) then is controlled to select a different gear and the process continues until a gear has been successfully engaged or other selected control parameters have been satisfied.

In one example, the controller 32 also determines the temperature of at least selected portions of the transmission 24 such as lubricant, for example. When the determined temperature is below a selected cold threshold, the offset or incrementing value may be multiplied by a desired factor. In one example, when the detected temperature of the transmission 24 is below the chosen threshold, the offset value is doubled compared to the offset value used when the temperature is above the threshold.

In another example, the controller 32 preferably utilizes temperature information regarding the transmission 24 to customize the baseline target closed clutch position. If the temperature is below a selected threshold, the initial clutch position used is offset by a chosen amount. In another example, the baseline or least-closed target clutch position is doubled when the transmission temperature is below the chosen threshold.

In another example system designed according to this invention, when the temperature is below a cold threshold the maximum number of attempts that the controller 32 is allowed to conduct preferably is increased.

Figure 5:
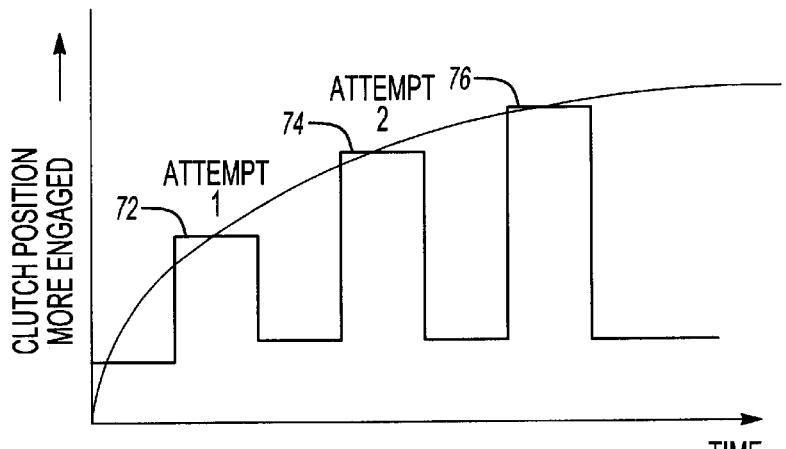
FIG. 5 graphically illustrates another example clutch closing strategy according to this invention.

FIG. 5 schematically illustrates another variation where the amount that the target clutch position is incremented changes over time. In FIG. 5, the difference between the clutch position 72 and the clutch position 74 is greater than the difference between the clutch position 74 and the clutch position 76. By reducing the amount of change in clutch position over time, a non-linear curve 78 approximates the changes in the target clutch position over time.

The inventive arrangement allows for overcoming an undesirable tooth butt condition for a greater variety of transmissions, vehicles and operating conditions. The baseline or least-closed clutch position may be set low enough to accommodate some circumstances, yet the inventive system still accommodates situations requiring a more closed clutch position. Further, the inventive arrangement provides for more consistent and desirable engagement of the desired gear ratio.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of overcoming a tooth butt condition in a vehicle transmission, comprising the steps of:
   (A) determining that a tooth butt condition exists;
   (B) selectively controlling a clutch to reach a target closed position;
   (C) determining whether the tooth butt condition still exists; and
   (D) changing the target closed position and controlling the clutch to reach the changed target closed position.

2. The method of claim 1, including performing step (D) repeatedly until a selected condition is satisfied.

3. The method of claim 2, wherein the selected condition includes successful engagement of a desired gear ratio.

4. The method of claim 2, wherein the selected condition includes a preselected period of time expiring.

5. The method of claim 2, wherein the selected condition includes a maximum number of attempts being completed.

6. The method of claim 2, wherein the selected condition includes the target closed position reaching a maximum desirable closed position.

7. The method of claim 1, including incrementing the closed clutch position a selected amount with each attempt.

8. The method of claim 1, including incrementing the closed clutch position using a changing increment between each successive attempt.

9. The method of claim 1, including changing the target closed position of step (B) based upon at least one determined characteristic of the transmission.

10. The method of claim 9, wherein the characteristic is one of temperature, lubricant viscosity or age of the transmission.

11. The method of claim 1, including determining a temperature of at least one selected portion of the transmission and modifying the clutch control when the temperature is below a selected threshold.

12. A vehicle driveline system, comprising:
    a transmission having a plurality of gear members that are selectively engageable to provide a plurality of gear ratios;
    a clutch associated with the transmission to selectively couple the transmission to an engine; and
    a controller that selectively closes the clutch to a target closed clutch position during a tooth butt condition and changes the target closed clutch position over time until a selected criteria has been satisfied.

13. The system of claim 12, wherein the selected condition includes successful engagement of a desired gear ratio.

14. The system of claim 12, wherein the selected condition includes a preselected period of time expiring.

15. The system of claim 12, wherein the selected condition includes a maximum number of attempts being completed.

16. The system of claim 12, wherein the selected condition includes the target closed position reaching a maximum desirable closed position.

17. The system of claim 12, wherein the controller determines at least one characteristic and modifies the clutch control responsive to the determined characteristic.

18. The system of claim 17, wherein the controller modifies the clutch control when a temperature associate with the transmission is below a chosen threshold.

* * * * *